United States Patent [19]

Householder

[11] Patent Number: 4,953,223

[45] Date of Patent: Aug. 28, 1990

[54] SPEAKER MOUNTING SYSTEM

[76] Inventor: George G. Householder, 1432 Reservoir Ave., Roslyn, Pa. 19001

[21] Appl. No.: 241,465

[22] Filed: Sep. 8, 1988

[51] Int. Cl.[5] .......................... H04R 1/20; H04R 1/24; H04R 1/26

[52] U.S. Cl. ...................................... 381/188; 381/24; 381/90; 381/182; 381/205; 439/17

[58] Field of Search ................. 381/188, 205, 24, 182, 381/87, 88, 90; 439/11, 13, 17, 18, 19

[56] References Cited

U.S. PATENT DOCUMENTS

| | | | |
|---|---|---|---|
| 1,546,501 | 7/1925 | Martus | 439/18 |
| 1,590,569 | 6/1926 | Fisk | 439/17 |
| 2,115,135 | 4/1938 | Benbow | 191/12 R |
| 2,179,840 | 11/1939 | Bucky | 381/90 |
| 2,203,715 | 6/1940 | Benecke | 381/89 |
| 2,481,823 | 9/1949 | Cejka | 439/10 |
| 2,562,979 | 8/1951 | Yingling | 191/23 A |
| 2,798,172 | 7/1957 | Jones | 307/147 |
| 3,061,973 | 11/1962 | Oberdorf | 381/90 |
| 3,089,042 | 5/1963 | Hickey et al. | 307/147 |
| 3,214,579 | 10/1965 | Pacini | 439/110 |
| 3,246,074 | 4/1966 | Neumann et al. | 174/48 |
| 3,385,929 | 5/1968 | Magyar et al. | 381/24 |
| 3,479,632 | 11/1969 | Galles | 439/10 |
| 3,546,367 | 12/1970 | Hart et al. | 174/99 B |
| 3,589,083 | 6/1971 | Sclafani | 52/27 |
| 3,668,601 | 6/1972 | McFarlin | 439/110 |
| 3,720,787 | 3/1973 | Ishii et al. | 381/90 |
| 3,748,463 | 7/1973 | Trassinelli | 439/10 |
| 3,903,989 | 9/1975 | Bauer | 181/144 |
| 3,911,221 | 10/1975 | Wong | 381/188 |
| 4,054,750 | 10/1977 | Montgomery et al. | 381/205 |
| 4,139,734 | 2/1979 | Fincham | 381/188 |
| 4,175,809 | 11/1979 | Dusko | 439/22 |
| 4,264,945 | 4/1981 | Ullman | 362/147 |
| 4,475,226 | 10/1984 | Greenberg | 381/24 |
| 4,533,190 | 8/1985 | Booty | 439/110 |
| 4,757,544 | 7/1988 | Guy | 381/205 |

FOREIGN PATENT DOCUMENTS 3040817 5/1982 Fed. Rep. of Germany .......... 3/142

Primary Examiner—Jin F. Ng
Assistant Examiner—Danita R. Byrd
Attorney, Agent, or Firm—John E. Reilly

[57] ABSTRACT

A speaker mounting system includes a standard or pole with conductor lines therein for the purpose of conducting signals from an audio source, one or more towers in surrounding relation to the standard having commutator rings electrically connected to the audio signal conductor lines, each collar being adjustable to different selected positions on the standard, and a globular or annular speaker housing is disposed on each collar in surrounding relation to the standard with a speaker in each housing which is connected to the commutator ring of that collar and the speaker housing being free to move with the collar along the length of the standard. The necessary electrical connection is maintained between each speaker and commutator ring not withstanding rotation or lengthwise movement of each speaker housing and, if desired, light fixtures can be provided in each housing and energized by separate electrical conductors on the support member.

10 Claims, 2 Drawing Sheets

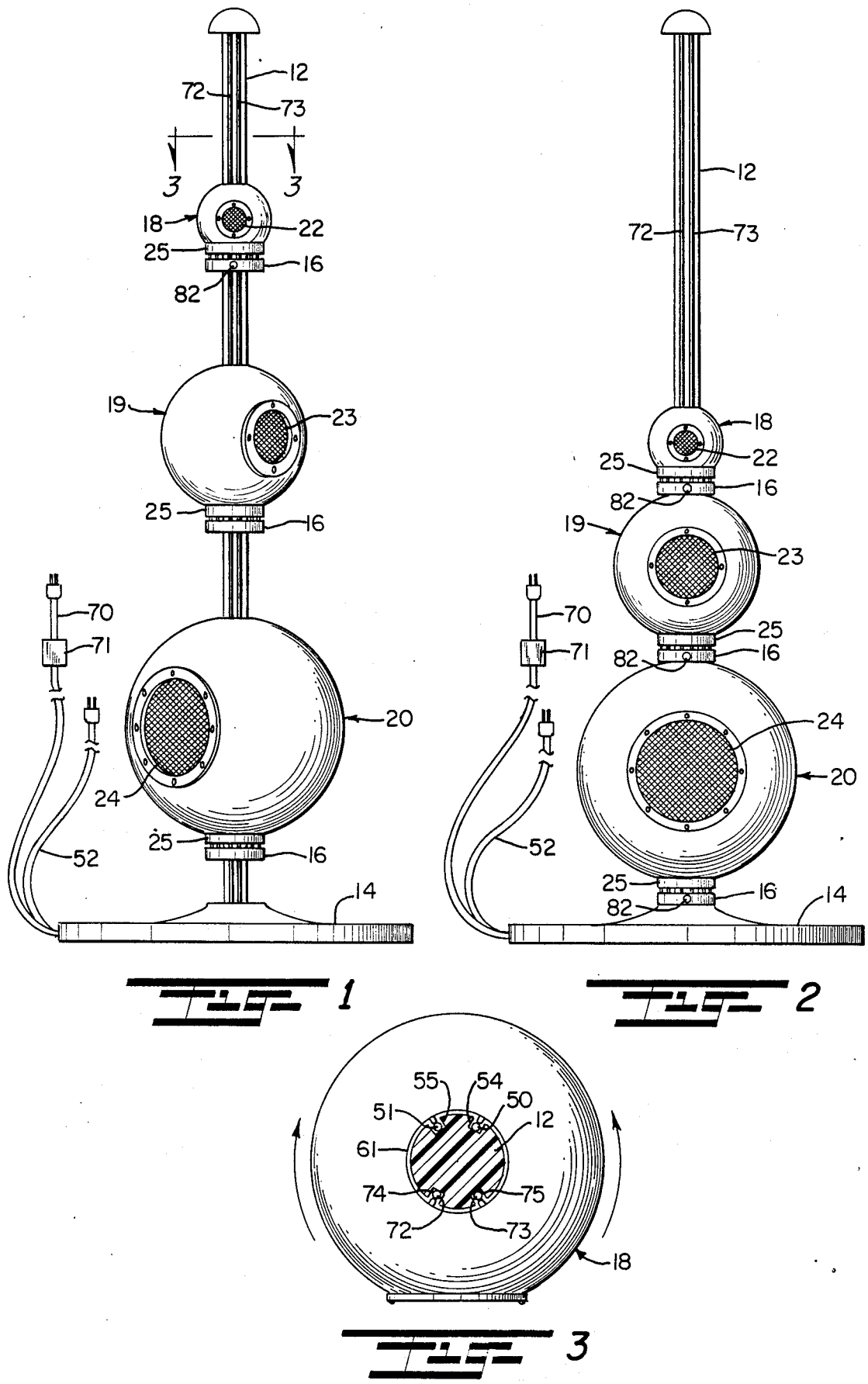

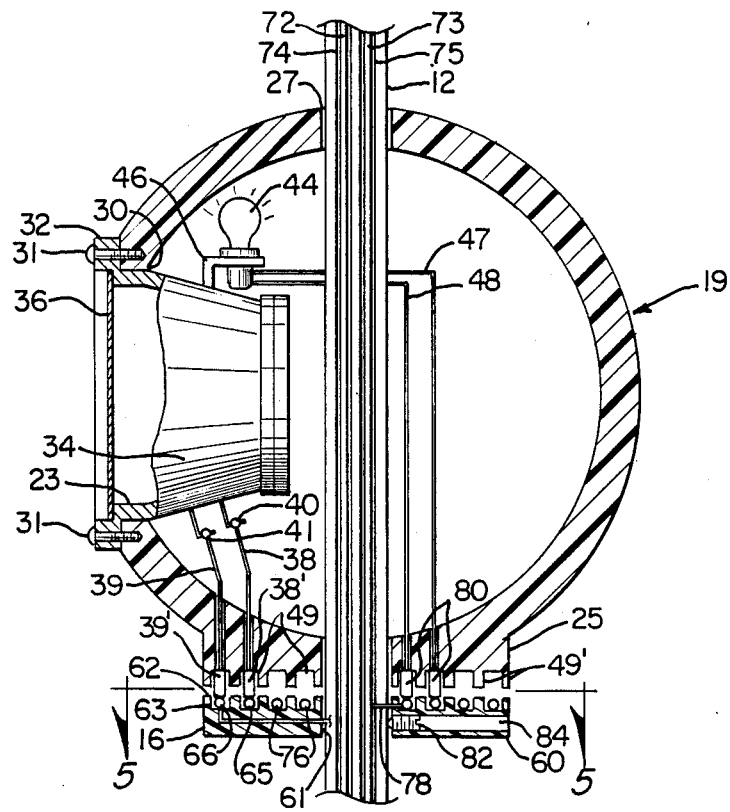
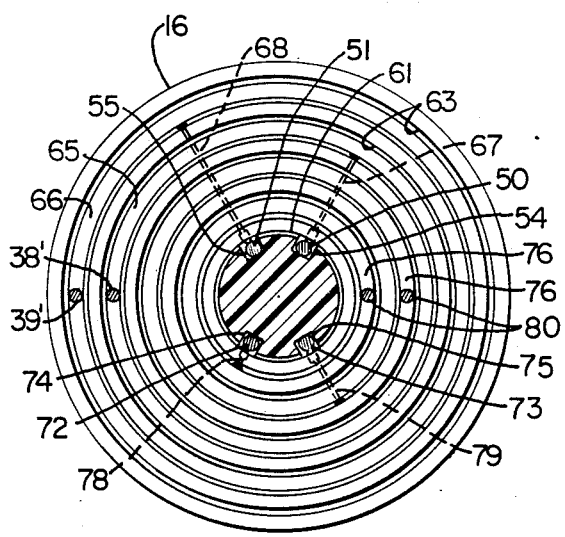

4,953,223

SPEAKER MOUNTING SYSTEM

This invention relates to speaker systems and more particularly relates to a novel and improved speaker mounting system to facilitate adjustable mounting and orientation of a plurality of speakers or speaker components on a common support and wherein the speakers are so constructed and arranged as to greatly enhance the appearance of the system as well as to permit selective variation in the tonal quality and patterns created by the speaker system.

BACKGROUND AND FIELD OF INVENTION

Numerous approaches have been taken to the positioning and arrangement of speakers in a room so as to enhance the quality of sound emanating from the speakers. The speakers may be of the monaural or stereo variety and each speaker is typically made up of a tweeter, midrange and bass or woofer component with each component typically housed in a common case or cabinet. It is known that the tonal quality of speakers may be varied through selective positioning and orientation of the individual components of the speaker as well as those systems which employ a plurality of speakers, such as, of the stereophonic and quadrophonic variety.

It has been proposed to suspend speaker systems from elongated tracks, such as, those of the type employing a bus bar or hidden conductors so that the speakers may be slidingly advanced to different suspended positions while maintaining the necessary electrical contact with the audio source. Similarly it has been proposed to suspend light fixtures in very much the same manner and to employ a combination of speakers and light fixtures powered off of a common track. For example, reference is made to U.S. Letters Pat. No. 4,475,226 to Greenberg as well as U.S. Letters Pat. Nos. 2,179,840 to Bucky and 2,203,715 to Benecke. Although these systems and others are quite functional, generally they leave much to be desired in the way of conformability for use in different room environments and especially home entertainment systems as well as in providing a wider latitude of adjustability and orientation of the speakers for different room sizes and shapes.

Moreover, it has been proposed to provide speaker systems comprised of one or more generally spherical or globular housings and in which the speaker is so mounted as to permit adjustment of the directivity of the sound and particularly wherein a plurality of speakers are mounted within a common shell or housing. Illustrative of this approach is U.S. Letters Pat. No. 3,720,787 to Ishii et al. To my knowledge, however, no one has devised a satisfactory way of positioning one or more hollow spherical housings directly onto an elongated track or electrically conductive support in such a way as to permit adjustable positioning and orientation of the speaker(s) to enhance the tonal characteristics of the system while at the same time providing a decorative object or article of furniture.

SUMMARY OF INVENTION

It is therefore an object of the present invention to provide for a novel and improved speaker housing and mounting system therefor which is greatly simplified in construction and use, conformable for different speaker installations and capable of affording a broad range in selectivity in position and orientation for different applications.

Another object of the present invention is to provide for a novel and improved speaker mounting system in which a plurality of speakers having separate tweeter, midrange and woofer components can be stacked together on a common support and adjustably positioned or spaced and oriented with respect to one another to achieve different selected sound characteristics.

It is a further object of the present invention to provide for a novel and improved mounting system for one or more globular speaker housings on a common support and for the mounting of different speaker components and light features in each housing in such a way as to maintain electrical connection with the lighting as well as between a speaker source and the speakers notwithstanding longitudinal and rotational adjustment of the speakers and their associated housings with respect to one another.

A still further object of the present invention is to provide for slidable disposition of a plurality of speaker components on a common support which carries the necessary conductors to establish electrical connection between an audio signal source and the speakers and in such a way as to result in a highly attractive, aesthetic appearance for home or commercial entertainment systems.

In accordance with the present invention, there has been devised an audio system wherein an elongated support member is provided with audio signal conductors extending the substantial length of the support for the purpose of conducting signals from an audio source, there being at least one collar disposed in surrounding relation to the common support having commutator rings on said collar electrically connected to the audio signal conductor, releasable connecting means for adjustably fixing said collar at different selected positions on said support, and a speaker housing is disposed in surrounding relation to said support having a speaker mounted in said housing and means electrically connecting said speaker to said commutator ring, said speaker housing being movable with said collar along the length of said support member. The electrical connection between each speaker and asociated commutator ring is such that the speaker housing and attached speaker may be rotated with respect to said collar, and the audio signal conductor lines extend through the interior of said speaker housing Light fixtures can be provided in each housing and energized by separate electrical conductors on the support or by batteries.

The above and other objects of the present invention will become more readily appreciated and understood from a consideration of the following description of a preferred embodiment when taken in conjunction with the accompanying drawings, in which:

BRIEF DESCRIPTION OF DRAWINGS

FIG. 1 is a front view in elevation of a three-way speaker system with separate tweeter, midrange and woofer components separated and individually rotated to different positions on a common support in accordance with the present invention.

FIG. 2 is another elevational view of a preferred three-way speaker system with the speaker components stacked together and adjustably positioned to face in a common direction.

FIG. 3 is a cross-sectional view taken about lines 3—3 of FIG. 1.

FIG. 4 is an enlarged view partially in section of a preferred form of speaker housing as illustrated in FIGS. 1 to 3 mounted on a common support member; and FIG. 5 is a cross-sectional view taken about lines 5—5 of FIG. 4.

DETAILED DESCRIPTION OF PREFERRED EMBODIMENT

Referring in detail to the drawings, there is shown by way of illustrative example in FIGS. 1 and 2 different adjusted positions of a preferred form of speaker mounting system. The preferred form of system 10 is broadly comprised of an elongated common support consisting of a vertical pole or standard 12 and a heavy base plate member 14 provided with a central opening, not shown, in which the lower end of the pole or standard 12 is anchared A plurality of collars 16 are adjustably positioned on the pole 12, there being a collar 16 for each of a plurality of speaker housings 18, 19 and 20, each of which rests on an individual collar. Thus the vertical spacing between speaker housings is determined by the adjustable positioning or spacing between the collar 16 on the pole. Each speaker housing is hollow and, in the preferred form, a three-way speaker system is illustrated with a tweeter represented at 22 in upper speaker housing 18, midrange speaker 23 in intermediate speaker housing 19, and a woofer 24 in the lower housing 20. As noted from a comparison of FIGS. 1 and 2 and as hereinafter described in more detail, the speaker housings and associated speakers may be spaced apart or stacked together, and the individual speakers 22, 23 and 24 may either be oriented in different directions or in a common direction by manual rotation of the speaker housings independently of the collars 16.

As will be seen from a more detailed consideration of FIGS. 3, 4 and 5, each speaker housing is of hollow spherical configuration having aligned, top and bottom diametrically opposed circular openings 27 and 28 for extension of the pole or standard 12 therethrough. Preferably, each housing is composed of a hard plastic, rubber or rubber-like material and is provided with a laterally directed opening or recess 30 which is sized for mounting of one of the speakers 22, 23 and 24. As shown in FIG. 4, the speaker 23 is mounted in the wall of the speaker housing by means of suitable fasteners or screws 31 extending through an annular flange 32 at the outer divergent end of speaker cone 34 and with the grill cloth 36 of the speaker extending across the flange portion as shown and with the speaker drive located interiorally of the speaker housing 19. Lead wires 38 and 39 extend from terminals 40 and 41, respectively, on the speaker cone for electrical connection to audio signal conductor lines in a manner to be described. The lower end of each housing 18, 19 and 20 is provided with a base 25 having a series of alternating concentric grooves and ribs 49 and 49', respectively, the ribs being coextensive with one another to define a relatively level surface for flush mounting on the upper surface of each collar 16. The lead wires 38 and 39 from the speaker have lower terminal ends as shown which project downwardly through vertical bore's in communication with the spaced concentric ribs 49'. Although not shown, a suitable filter or filters can be provided in each speaker component to filter out unwanted frequencies for each of the speakers 22, 23 and 24 in delivering audio signals from a common source in accordance with conventional practice.

In accordance with the present invention, the preferred form of common support 12 takes the form of a solid pole or standard as described for the purpose of supporting the speaker housings 18-20 in predetermined spaced relation to one another and as a carrier for audio signal conductor lines 50 and 51 which serve, respectively, as the positive and return lines from and to a conventional audio or sound source, not shown. Preferably, the lines or wires form a continuation of a common cable 52 which is directed through the base 14 and continues along closely spaced longitudinally extending grooves 54 and 55 for the entire length of the standard 12. In order to establish electrical connection into the speakers 22-24, each collar 16 is preferably in the form of a relatively thick disk or plate 60 provided with a central opening 61 for insertion of the standard 12, and upwardly directed, alternating concentric ribs and grooves 62 and 63. A pair of the outer grooves are provided with inner and outer concentric wires or commutator rings 65 and 66 with lead wires 67, 68 extending respectively from a ring 65, 66 radially through the thickness or body of the collar to terminate in contacts which establish electrical connection with the audio signal conductors 50 and 51. In turn, the lead wires 38 and 39 from the speaker terminals 40 and 41 have lower contacts 38' and 39', respectively, which establish electrical connection with the rings 65 and 66 as illustrated in FIG. 4. Each of the collars is adjustably fixed to the standard 12 by a releasable connector in the form of a set screw 82 threadedly inserted into a radial bore 84 in the collar and tightened to bear against the standard 12.

By placing the necessary conductors or wiring for the speakers within the grooves 54 and 55 in the standard it is possible to leave the wires exposed in maintaining good electrical contact between the wires 50, 51 and the rings 65 and 66. The rings are correspondingly hidden or retained within the grooves 63, and the contacts 38', 39' from the lead wires 38 and 39 project into firm engagement with the rings 65 and 66 to complete the electrical connection into the speaker terminals 40 and 41. Again, the rings 65 and 66 are exposed to establish optimum contact or electrical connection into the lead wires 38 and 39 notwithstanding relative rotation of the speaker housing 19 with respect to the collar 16.

When it is desired to provide an illuminated housing, a suitable light fixture 44 may be mounted on the speaker cone or otherwise anchored within the interior of the speaker housing by means of a suitable bracket 46. Lead wires 47 and 48 extend from the base or socket portion of the light fixture for connection into separate connecting wires.

In those installations where light fixtures 44 are to be provided, the standard 12 may provide the necessary source of power from an electrical outlet, not shown, via an electric cord 70 having a step-down transformer 71 and electrical wires 72 and 73 from the transformer which extend upwardly through grooves 74 and 75 in the standard 12. As noted, the grooves are disposed in diametrically opposed relation to the audio signal conducting grooves 50 and 51, and the wires 72, 73 extend through the grooves 74 and 75 for the full length of the standard 12. Innermost grooves 63 on the collar 16 serve to retain inner commutator rings 76 with leads 78 extending radially inwardly through the thickness of the collar and terminating in contacts which engage the wires 72, 73. Contacts 80 at the lower ends of the lead wires 47 and 48 to the base 46 of the light fixture 44 establish electrical connection with the ring 76. Thus in the same manner as described with respect to the audio signal conductor lines, electrical connection is maintained between the light fixtures 44 and electrical outlet notwithstanding vertical movement or adjustment of the speaker housings and collars 16 along the length of the standard 12. The transformer 71 will of course maintain the voltage at a safe operating level on the order of 6 to 12 volts for energization of the light 44. Similarly, the voltage level for the speakers is retained within a safe level but more than sufficient for operation of the speakers from the amplifier section of the tuner.

While the collar 16 is not free to rotate, it will be appreciated that the base 25 of each speaker housing is freely rotatable with respect to its associated collar so that the orientation or direction of the speakers may be shifted or rotated simply by manual rotation of the speaker housing without disturbing the mounting of the collar 16 with respect to the standard 12. In the form in which the speaker housings are intended to be illuminated, most desirably the housings are composed of an unbreakable, translucent plastic material. Similarly the standard 12 and collars 16 are composed of a plastic or other non-conducting material so that the electrical conductors or wiring are insulated from one another and maintain separate electrical paths. In this relation, the voltage level from the audio output may be maintained within less than one volt while that of the electrical wiring from the transformer maintained within the range of six to twelve volts for the lamp circuit. In the preferred form, for the purpose of illustration and not limitation, standard wiring is employed throughout, and the contacts provided for the speaker and lamp circuit into the collar 16 may be standard fixed contacts or terminals. Most desirably, however, the contacts for the leads extending between the collar 16 and standard 12 are spring-loaded contacts in order to assure good connections from the conductor lines into the speaker and lamp circuit.

The present invention has been described specifically in relation to a monaural, three-way speaker system. Nevertheless, it will be readily appreciated that the principles of the present invention are applicable to single speaker housings mounted on a single standard or to multiple speaker systems, such as, commonly employed in stereo and quadrophonic sound systems. Thus the speakers may be mounted on one or more standards or poles and spaced in different arrangements or locations about a room area to lend the desired tonal and decorative effect.

It is therefore to be understood from the foregoing that various modifications and changes may be made in the construction and arrangement of elements comprising the present invention without departing from the spirit and scope thereof as defined by the appended claims.

I claim:

1. In an audio system wherein an elongated support member includes electrical conductors extending the substantial length of said support member and means for supplying an audio signal to said conductors, the improvement comprising:
   at least one collar disposed in surrounding relation to said support, said at least one collar having at least one commutator ring therein electrically connected to said audio conductors and adjustable means adjustably fixing said at least one collar at a selected position on said support, and
   at least one speaker housing disposed on said collar in surrounding relation to said support member including a speaker mounted in said at least one speaker housing having electrical terminals electrically connected to said at least one commutator ring.

2. In an audio system according to claim 1, said at least one speaker housing having an exterior wall portion and said speaker mounted in said wall portion.

3. In an audio system according to claim 2, said wall portion being generally spherical with a chordal recess formed therein, and said speaker mounted in said recess.

4. In an audio system according to claim 1, said at least one speaker housing and said speaker being rotatable with respect to said support, and said electrical connecting means being rotatable with respect to said at least one commutator ring while maintaining electrical contact with said ring.

5. In an audio system according to claim 1, there being a plurality of collars and corresponding plurality of speaker housings, each of said speaker housings including a generally ring-like base member with said electrical connecting means extending from said ring-like base member into a groove in which said at least one commutator ring is positioned.

6. In an audio system according to claim 1, said audio signal conductor defined by wires extending in longitudinal grooves in said support, said support member being in the form of a standard and a base plate member at the lower end of said standard, a plurality of said speaker housings mounted on said standard, each said speaker housing resting on one of said collars.

7. A speaker mounting system comprising in combination:
   an elongated standard including means supporting said standard in upstanding relation, electrical conductors extending through longitudinal grooves for the substantial length of said standard, and means for supplying an audio signal to said conductors;
   a plurality of collars disposed in surrounding relation to said standard, each collar having at least one commutator ring therein electrically connected to said conductors, and releasable locking means adjustably fixing each said collar at a selected position on said support; and
   a plurality of speaker housings, each housing disposed on one of said collars in surrounding relation to said standard, a speaker component mounted in each of said housings having electrical terminals in contact with said commutator rings, each said housing being rotatable with respect to said collar on which it is mounted, said releasable locking means being independently adjustable to vary the spacing between said speaker housings.

8. A speaker mounting system according to claim 7, a light fixture disposed in each of said speaker housings, electrical connecting means extending through longitudinal grooves in said standard, said electrical connecting means connected to a source of power for said light fixtures, each said collar having an additional commutator ring electrically connected to said electrical connecting means, and each said light fixture including electrical contacts engaging said additional commutator ring.

9. A speaker mounting system according to claim 7, each of said speaker housings being of hollow spherical configuration a-d provided with top and bottom aligned openings for insertion of said standard therethrough, each said housing having a base member resting o- one of said collars.

10. A speaker mounting system according to claim 9, said collars and said base members having aligned alternating ribs and grooves in confronting relation to one another.

* * * * *